(12) United States Patent  
Horne et al.

(10) Patent No.: US 6,247,644 B1  
(45) Date of Patent: Jun. 19, 2001

(54) SELF ACTUATING NETWORK SMART CARD DEVICE

(75) Inventors: Samuel Norman Horne, Kansas City, MO (US); George Doan Indorf, Edwardsville, KS (US); Samuel Keith Bowman, Jr., Lenexa, KS (US); Danny Wayne Carr, Shawnee, KS (US)

(73) Assignee: Axis AB, Scheelevagen Lund (SE)

( * ) Notice: Subject to any disclaimer, the term of this patent is extended or adjusted under 35 U.S.C. 154(b) by 0 days.

(21) Appl. No.: 09/300,542

(22) Filed: Apr. 27, 1999

(Under 37 CFR 1.47)

Related U.S. Application Data

(60) Provisional application No. 60/083,306, filed on Apr. 28, 1998.

(51) Int. Cl.[7] .......................... G06K 05/00; G06K 19/06
(52) U.S. Cl. ............................. 235/380; 235/492
(58) Field of Search ..................... 235/381, 380, 235/492, 486, 487, 441; 382/128, 119, 117, 118

(56) References Cited

U.S. PATENT DOCUMENTS

| | | | |
|---|---|---|---|
| 5,307,411 | * | 4/1994 | Anvret et al. .......................... 380/28 |
| 5,310,999 | * | 5/1994 | Claus et al. .......................... 235/384 |
| 5,739,516 | * | 4/1998 | Bricaud ................................ 235/441 |

* cited by examiner

*Primary Examiner*—Thien M. Le  
(74) *Attorney, Agent, or Firm*—Charles C. Cary; Cary & Kelly, L.L.P.

(57) ABSTRACT

The smart card drive of the present invention includes a smart card device having a microprocessor and a smart card adapter serially connected to a local, dedicated modular computer circuit having a network interface circuit. The combination of these components creates a smart card drive that is able to initiate a network connection and communicate with any peer node in a local area network also equipped with a network interface circuit and network listening software.

3 Claims, 7 Drawing Sheets

TRANSACTION FLOW

SCP (Serial Client Processor) Idle
NTP (Network Transport Processor) Idle
STP (Server Transaction Processor) Idle

User Approaches the door and inserts their Smart Card

SCP-Sends SYNCBYTE+"CARD IN" transaction initiation request SCP==>NTP

NTP-Allocates a server peer-to-peer network request NTP==>STP

STP-Acknowledges the connection request NTP<==STP

NTP-Passes the data message to the server NTP==>STP

STP-Server takes over and asks for the card ID. Sends a SYNC BYTE+READ CARD REQ + START ADDRESS + LENGTH message NTP<==STP

NTP- Translates the network message into a serial message and sends it to the reader SCP<==NTP

SCP- Process the read-card-data and responds back to the STP by sending a SYNCBYTE+DATA message SCP==>NTP

NTP-    Converts the serial message to a network message and sends it to the server    NTP==>STP

STP-    Receives the data, looks up the card ID in it's database for the cardholder account. Asks for the cardholder's PIN number. Sends a SYNCBYTE+GETKEYPAD DATA message.    NTP<==STP

FIG. 4A

TRANSACTION FLOW

NTP-Translates the network message into a serial message and sends it to the reader SCP<==NTP

SCP - Processes the get-keypad-data data and responds back to the STP by sending a SYNC BYTE+DATA message SCP==>NTP

NTP-Converts the serial message to a network message and sends it to the server NTP==>STP

STP-Receives the data, validates in it's database for the cardholder account. Sends a SYNC BYTE+OPEN DOOR RELAY message NTP<==STP

NTP- Translates the network message into a serial message and sends it to the reader SCP<==NTP

SCP-Processes the open-door-relay data, actuates it's relay circuitry, and opens the door. Once the relay time expires, it sends a completion message to the server and goes back to idle state to wait for a new transaction. Sends a SYNC BYTE+"COMPLETION MESSAGE DATA" SCP==>NTP

NTP-Converts the serial messsage to a network message and sends it to the server NTP==>STP

STP - Receives the completion message and sends a close-connection message back to the network processor and returns to idle state. NTP<==STP

NTP-Reveices the close-connection message and returns to idle state as well.

FIG. 4B

SELF ACTUATING NETWORK SMART CARD DEVICE

RELATED APPLICATION

This application is based on U.S. provisional application Serial No. 60/083,306, filed Apr. 28, 1998 now expired.

BACKGROUND OF THE INVENTION

A. Field of the Invention

This invention relates generally to serial computer input devices and in particular to a peripheral smart card device which includes a microprocessor and a modular computer circuit board having a network interface circuit.

B. Prior Art

Small transaction devices such as smart card devices, magnetic swipe devices, fingerprint readers and other biometrics devices are becoming increasingly popular in the United States, as well as abroad. The use of these transaction devices is currently common in the credit card, banking and security industries. Although smart card technology has been around for some time in Europe, smart card technology is just beginning to gain popularity in the United States, especially in the health care industry and with the government.

Currently, these small transaction devices communicate serially with a computer in order to transmit data to (or receive data from) the computer or a network system via that computer. This connection may be made using a serial cable which fits into one of the computer's communication ports. As serial devices, these small transaction devices have several very prominent drawbacks that are overcome by the present invention.

1. Sharing

Current smart card devices transfer data using a serial communication interface. A serial communication interface refers to the manner in which data is sent over the serial cable that connects the serial device to another computer. When it is said that data bytes are sent "serially", it is meant that that data bytes are sent one bit at a time, from one end of the serial connection to the other, in series. The bits are then reassembled back to data bytes when they reach the other end of the serial cable connection. This is the same technique used by most computer modems to transmit data from one computer to another.

In systems using physical cabling to connect the transaction devices to a computer, the serial cables must be severely limited in length to avoid signal degradation. Furthermore, the speed of data transfer over that cable is also limited and is several orders of magnitude lower than internal personal computer data transfer rate (over 100 million bits per second) or Local Area Network (LAN) data transfer rate (generally between 4 and 16 million bits per second). In fact, a serial connection is generally limited to a transfer rate of less than 100,000 bits per second.

Furthermore, current smart card and other small transaction devices require connection to a personal computer to support communication with other devices. In most instances, absent a terminal server or other like device, two personal computers in a local area network (LAN) could not both use the services of a single serial device without physically disconnecting that serial device from one computer and reattaching it to the other computer. Although one can use a terminal server to allow multiple users to access a serial device, current terminal servers and other like devices are not technologically advanced enough to support smart card serial devices. Thus, although there exists some means for sharing serial technology, until now, there has been no means for sharing smart card serial devices.

2. Node Limitations

Another limitation with serial devices is that only a limited number of serial devices can be connected to any one computer. Currently, not many more than 250 serial devices can be connected to any one computer. Again, this limits the current applications of smart card technology.

3. Polling

Currently available smart card devices also do not initiate data transfer on their own. Consequently, even the physical act of inserting a smart card into the smart card device does not initiate the data transaction. It is the associated computer's responsibility to "ask" the smart card devices, which are serially attached to the personal computer, whether each smart card device has a transaction present. This is a technique called "polling". The computer must constantly (and wastefully) poll the serial smart card device to determine if a transaction is present. Then, the computer must recognize that a transaction is waiting and specifically instruct the smart card device to engage itself for the transaction.

4. Intelligence

Smart card devices and most other transactional devices have been designed to only function as a serial device, and nothing more. The devices have no capability other than to respond to a server-initiated transaction and have not been designed to perform any other ancillary function. Likewise, current smart card devices have no ability to actuate other devices.

Many of the aforementioned problems that limit applications for smart card devices also limit the application of other small transaction devices such as, magnetic swipe device, fingerprint readers and other biometrics devices. Thus, while this disclosure is directed toward the employment of this technology to smart card devices, the foregoing technology can also be used in connection with other small transaction devices having the same, or nearly the same inherent limitations as today's smart card devices.

OBJECTS OF THE INVENTION

Accordingly, it is a primary object of the present invention to provide a smart card device having a microprocessor such that the smart card device does not require polling. It is a further object of the present invention to provide a network enabled smart card device that can be easily shared on a network without requiring an intervening computer or other "processing device." It is yet a further object of the present invention to provide a smart card device that has the ability to self actuate other devices, such as on/off switches, LED/LCD displays, key pads and other like devices.

Still other objects of the invention are (1) to virtually eliminate the current physical limitation on the number of serial device connections; (2) decrease the cost associated with incorporating a network of small transaction devices into a no n-serial network system; (3) eliminate the restrictions on cable length and type associated with serial connections; and (4) utilize the data transfer integrity and higher data transfer rates of a Local Area Network.

These and other objects of the present invention w ill be understood by those in the art having the present disclosure before them.

SUMMARY OF THE INVENTION

The smart card drive of the present invention include s a smart card device having a microprocessor and a smart card adapter serially connected to a local, dedicated modular computer circuit having a network interface circuit. The combination of these components creates a smart card drive that is able to initiate a network connection and communicate with any peer node in a local area network also equipped with a network interface circuit and network listening software. Thus, the smart card drive of present invention is able to eliminate and/or minimize many of the current limitations on smart card devices.

With the inclusion of the microprocessor in the smart card device itself, the smart card device is able to actuate other devices connected to the I/O unit of the microprocessor and has the ability to initiate transactions upon the triggering of certain events, such as a user placing his or her card in operable association with the smart card adapter. For example, the smart card microprocessor is able to transmit a data string to the local, dedicated modular computer, which initiates a network connection between the smart card drive and another computer on the network and then sends network-protocol formatted data to the network server for processing. This enablement of two-way communication between a smart card drive and another peer on a network is a very unique aspect of the present invention as well as a novel technology for use in connection with other small transaction devices. Further, in view of this construction, the smart card drive of the present invention is also capable of transferring transaction data directly through a local area network at the same high rate of speed as a computer's own local area network connection.

As a peer in a peer-to-peer network, the smart card drive of the present invention is also shareable in a local area network (LAN) without the physical intervention of terminal service required by other smart card serial devices. Unlike before, establishing a connection between a smart card device and another personal computer does not require any direct physical cable connection to any one personal computer other than smart card device's attachment to the modular computer circuit. The smart card drive of the present invention can operate both as a client and a server on the network. Thus, while the smart card drive of the present invention has the capability to initiate a connection to a personal computer, it is not restricted from receiving a connection request from the another computer on the LAN.

It is also contemplated that the smart card drive of the present invention is also useable in a client-server based network protocol resulting in the loss of some of the simplicity provided by the unfettered cross-accessibility of a peer-to-peer network.

BRIEF DESCRIPTION OF THE DRAWINGS

FIGS. 4a–b are flow charts indicating the flow of data between the smart card drive of the present invention and a network server.

DESCRIPTION OF A PREFERRED EMBODIMENT

Figure 1:
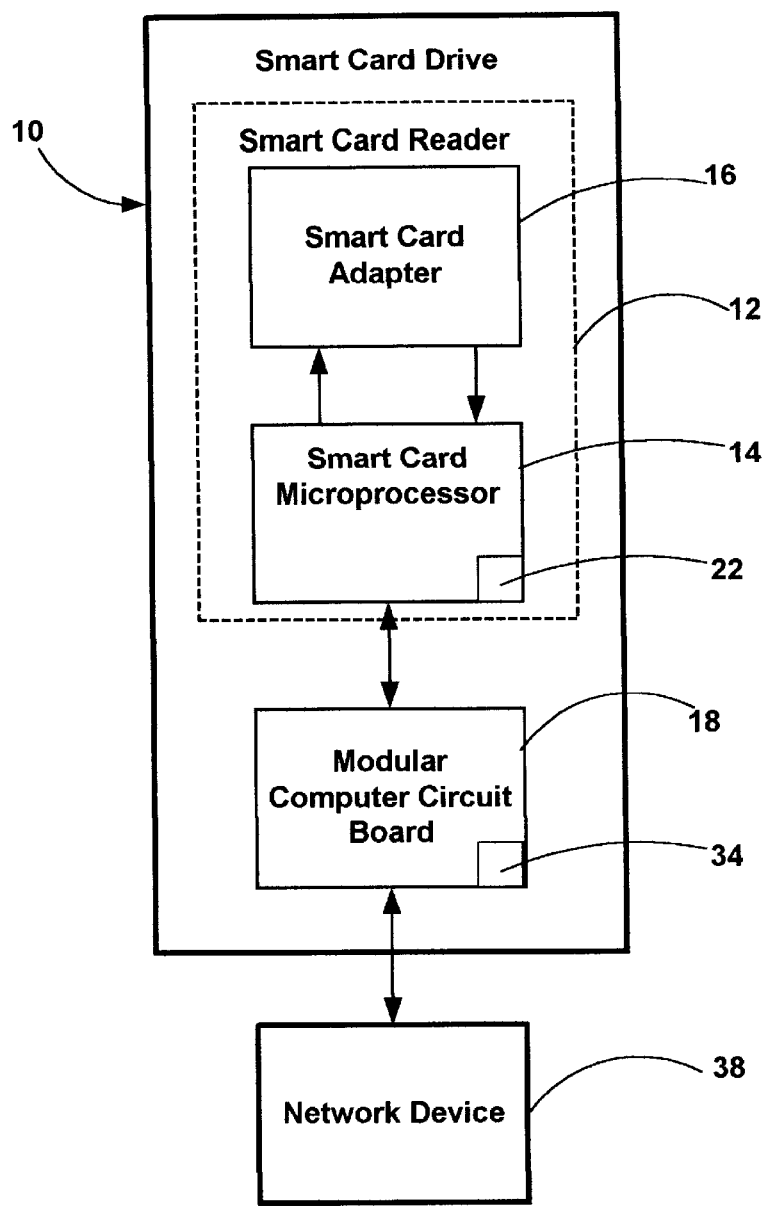
FIG. 1 is a block diagram of the self-actuated smart card drive of the present invention.

While the present invention may be embodied in many different forms, there is shown in the drawings and discussed herein two specific embodiments with the understanding that the present disclosure is to be considered only as an exemplification of the principles of the invention and is not intended to limit the invention to the embodiments illustrated. Furthermore, in illustrating and describing the present invention, various standard electrical components, circuits, power supplies and connections have been omitted so as not to unnecessarily obscure the various aspects of the present invention.

Figure 5:
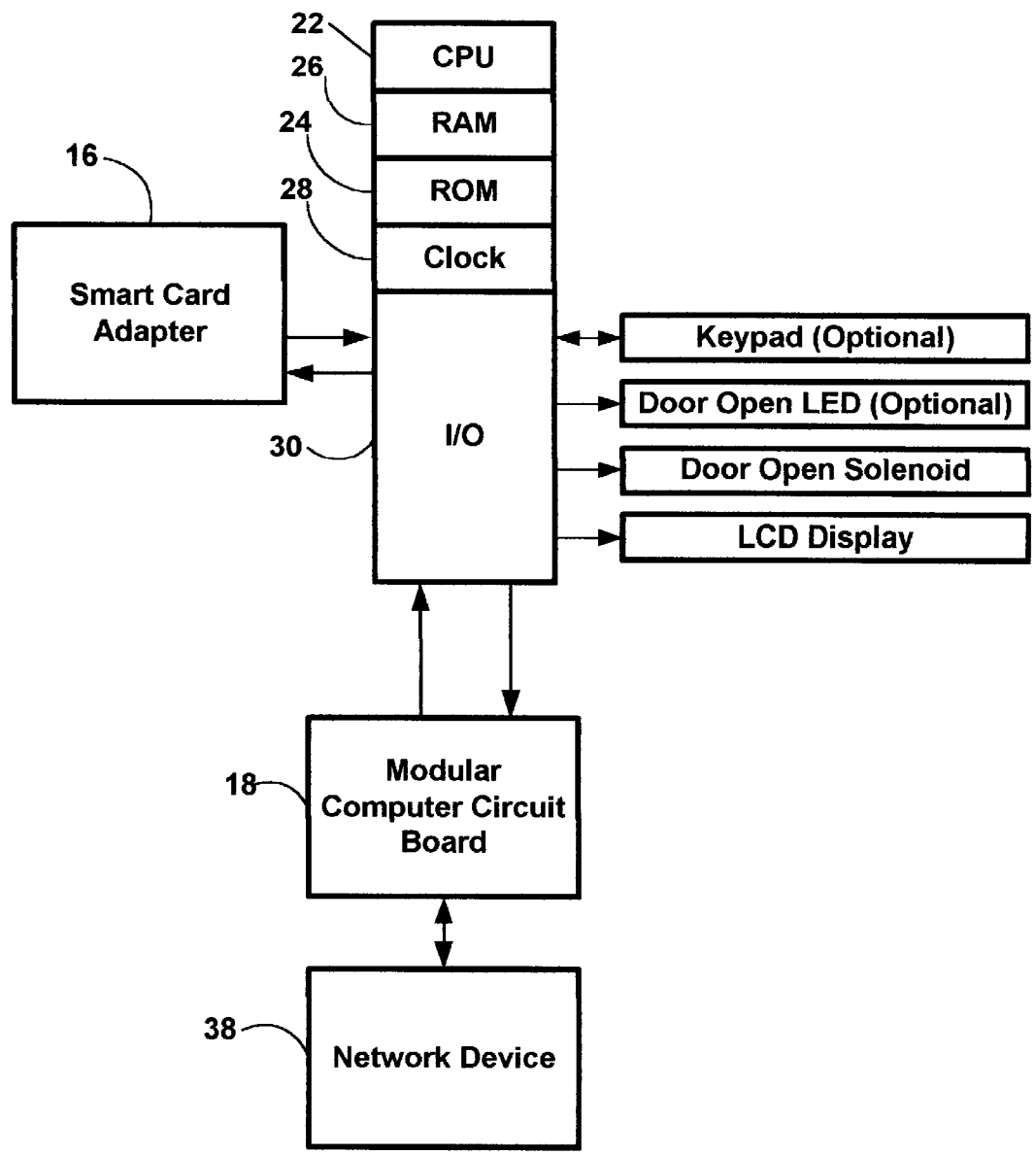
FIG. 5 is a block diagram of the smart card device of the present invention as it would appear if used in connection with other devices such as a LCD display and keypad.
Figure 6:
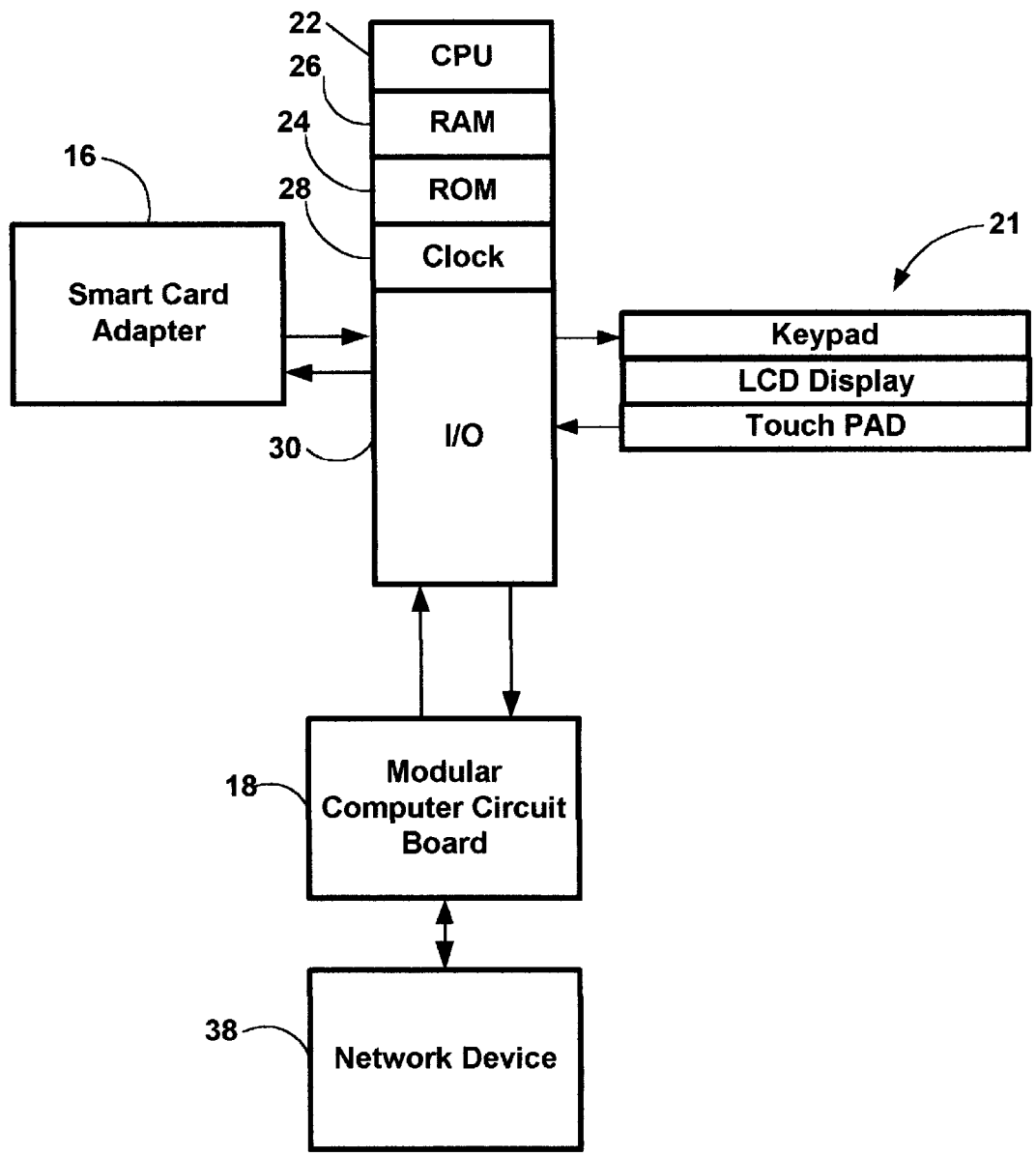
FIG. 6 is a block diagram of the smart card device of the present invention as it would appear if used in connection with a fingerprint reader.

The present invention overcomes the problems and disadvantages of the prior art by providing a self-actuated smart card drive 10 comprised of (1) a smart card device 12 having a smart card microprocessor 14 and smart card adapter 16 and (2) a local, dedicated modular computer circuit board 18 with network interface circuit 20. Although the preferred embodiment of the present invention is disclosed in the environment of a smart card device to actuate other devices and to network enable the smart card device 12, the present invention could also be utilized to actuate and enable other transaction serial devices, such as fingerprint readers and other biometrics devices, magnetic swipe devices, token machines, and key pads. Similarly, the technology of the present invention could be used in connection with the aforementioned serial devices alone, or in combination with one another. For example, as illustrated in FIG. 5, the smart card drive 10 of the present invention could be used in connection with a fingerprint reader 21 to verify a user's fingerprint against a fingerprint template stored on a network server or even on the smart card, itself, to enable the fingerprint reader to verify a user's fingerprint without causing additional network traffic.

As seen in FIG. 1, the smart card drive 10 includes (1) a smart card device 12 having a smart card adapter 16 and a smart card microprocessor 14 and (2) a local, dedicated modular computer circuit 18 having a network interface circuit 20. The function of the network interface circuit, as is generally known, is to control transmission of data over a network according to that network's protocol. As part of this function, the network interface circuit formats data in packets, multiplexes transmission of that data over the network, and watches for collisions or successful transmission of that data packet.

Figure 2:
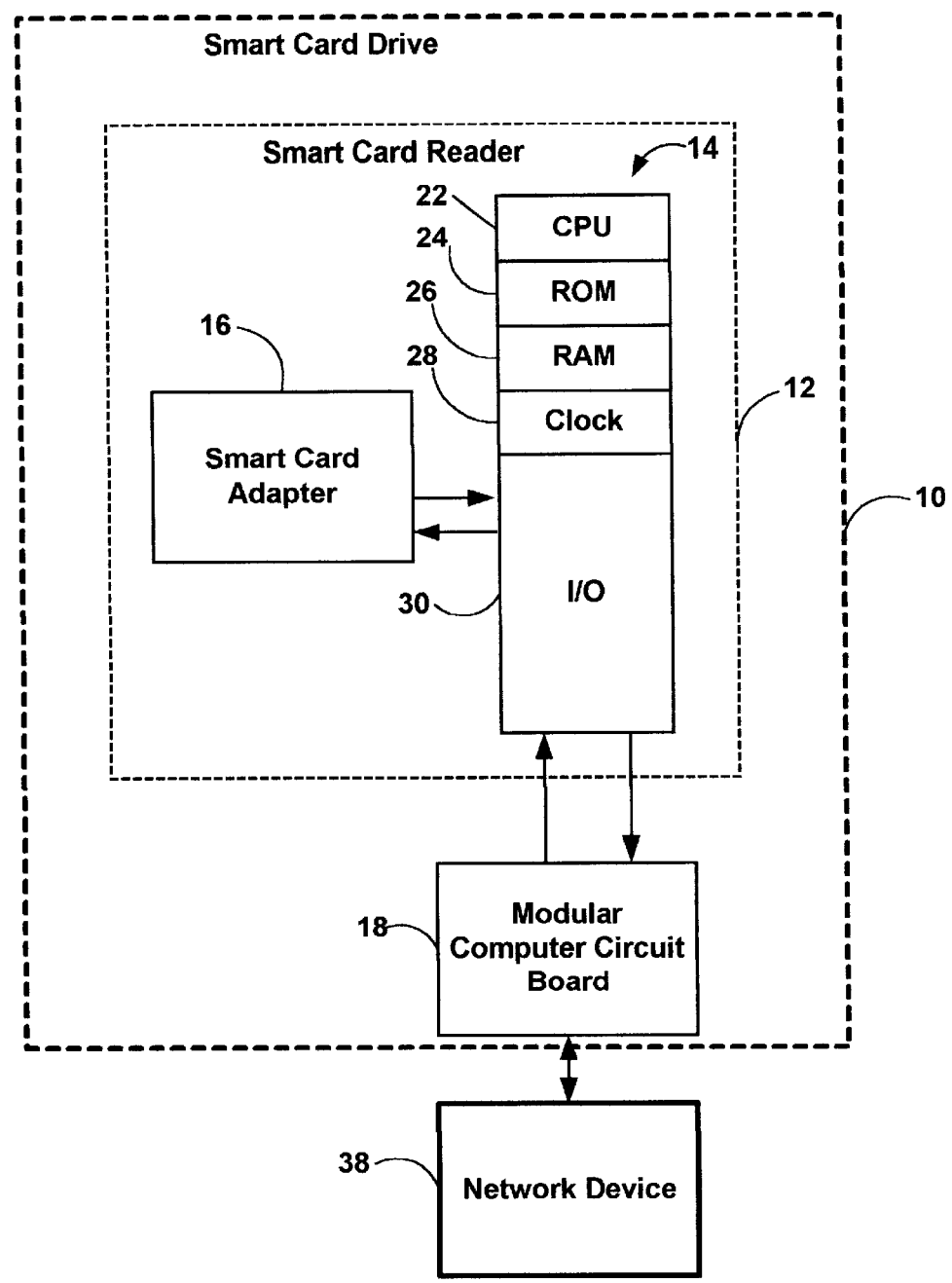
FIG. 2 is a block diagram of the smart card device of the present invention.

As seen in FIG. 2, the smart card microprocessor 14 of the smart card device 12 is comprised of a central processing unit (CPU) 22, read only memory (ROM) 24, read/write memory (RAM) 26, a clock 28, and input/output (I/O) unit 30. As illustrated in FIG. 2, the serial I/O port (not shown) and the smart card adapter 16 are connected to the I/O unit 30 of the smart card microprocessor 14. As shown in FIG. 5, other additional devices such as LED and LCD displays, keypads and other serial devices can be attached to the I/O unit in the smart card microprocessor 14 of the smart card device 12. By attaching other devices to the smart card microprocessor 14 of the smart card device via I/O unit 30, smart card device 12 is able to actuate and be actuated by those other devices. Additionally, the smart card device 12 may also include EEPROM memory, i.e. electrically erasable programmable read-only memory, as a means for reading and writing additional data to and from the smart card device. When utilized, the EEPROM memory is also connected to the I/O unit 30 of the smart card microprocessor 14 to allow the CPU 22 to read and write to and from the EEPROM.

Figure 3:
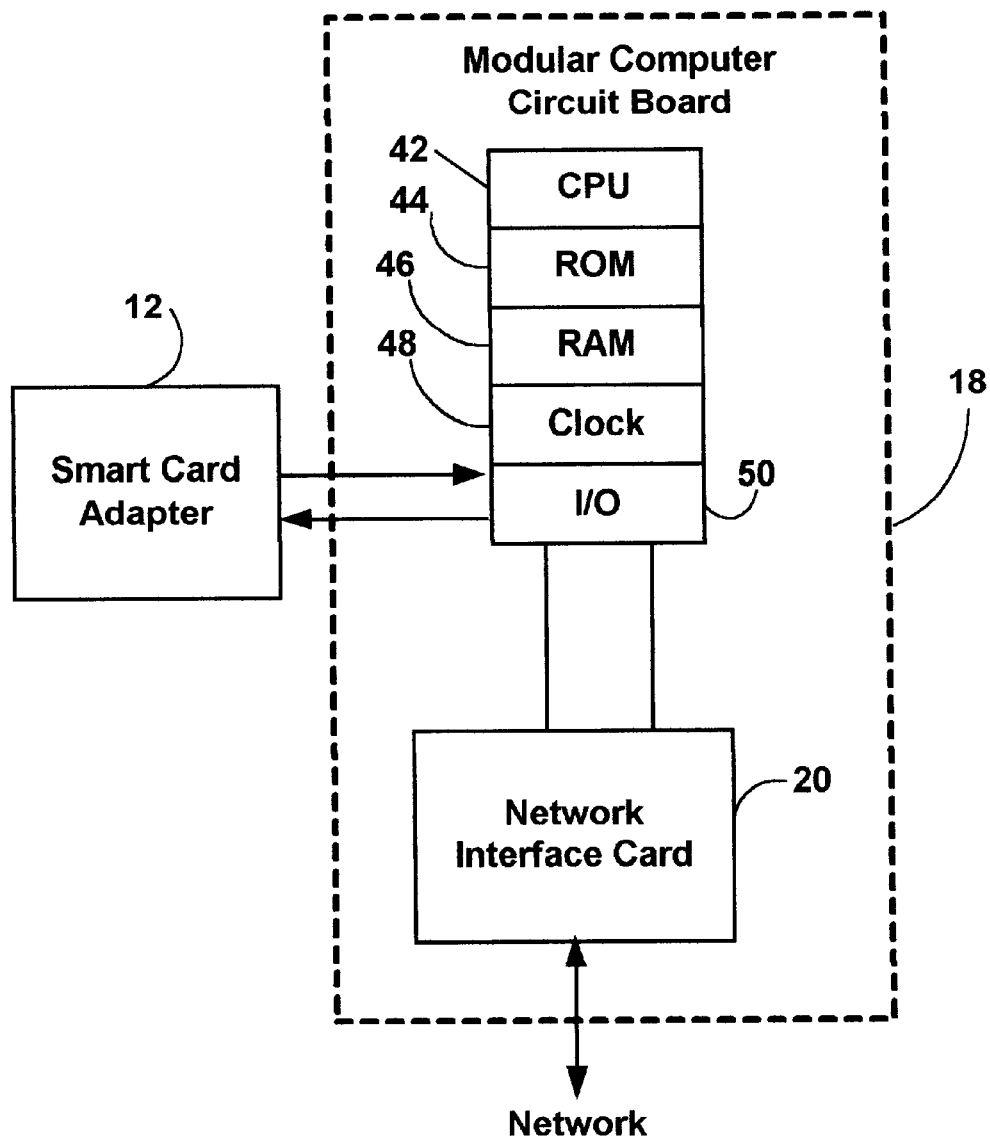
FIG. 3 is block diagram of the modular computer circuit board in operable association with a computer newtork.

As seen in FIG. 1, the serial I/O port of smart card device 12 is serially attached to the serial I/O port of the modular computer circuit 18. As illustrated in FIG. 3, the dedicated modular computer circuit 18 is connected locally to the smart card device. In addition to having a serial port, modular computer circuit 18 also has a microprocessor 40 which contains a central processing unit (CPU) 42, read only memory (ROM) 44, read/write memory (RAM) 46, a clock 48, and an input/output device 50. Attached to the I/O device 50 of the modular computer's 18 microprocessor 40 is a network interface circuit 20, which provides an Ethernet or other network connection for the smart card drive 10.

In the preferred embodiment, the network interface circuit 20 provides for an Ethernet connection and utilizes TCP/IP protocol to connect and send and receive data between the network and smart card drive 10. It is recognized, however, that the smart card drive 10 of the present invention could connect directly to any network architecture (e.g. token ring, AppleTalk, ARCnet, ATM, FDDI, SNA) or even to the Internet. Similarly, the network interface circuit 20 could be modified to connect to any transmission media, such as coaxial cable, unshielded and shielded twisted pair cable, fiber optic cable and the like. While TCP/IP protocol is preferred, the system could also be modified to use other protocols such as IPX/SPX, NetBEUI or APPC. All that is required of the smart card drive 10 is that the exchange of information between the smart card drive 10 and any other peer on the network be achieved through a networking protocol preferably using a "program-to-program" or "peer-to-peer" data communication protocol, although a client-server protocol would also work. Likewise, while a Windows 95 or Windows NT operating system is preferred, different network operating systems could be used, such as MVS, Unix and the like.

As seen in FIG. 4, the transaction flow between the smart card drive 10 and any other network device 38 involves software processors to achieve a network transaction interface including: (1) the serial client transaction processor; (2) the network translation/transport processor; and (3) the server transaction processor. As illustrated in FIG. 4, the transaction flow can be viewed as a "client/server" transaction interface model. The serial client transaction processor (SCP) is the transaction protocol covering a smart card reader, gaming/token interface, or other serial device that sends and receives messages from any other device on the network.

The server transaction processor (STP) is the transaction protocol covering the upstream networked computer, which accepts transaction requests from downstream serial devices. In the present invention, this is the central processing unit or microprocessor of the upstream computer which will process transactions originating from downstream serial client devices.

Finally, the network translation/transport processor protocol (NTP) covers the transport of messages originating from both the downstream serial components and upstream network servers and the data movement between serial communications and network communications. In this embodiment, this function is conducted local within the smart card drive by the microprocessor of the modular computer circuit 18.

At the start of a transaction, all processors are in idle state. In this "idle state," all of the networked nodes 38 and the smart card drive 10 are both initially powered on and listening for events. From there, a client event initiates a transaction and the message exchange begins. This exchange will generally begin with a handshaking protocol between smart card drive 10 and upstream networked node 38 to which the ultimate data message will be directed. This handshaking is controlled at the smart card drive side by the modular computer circuit. Modular computer circuit may be programmed to continually attempt to initiate the handshaking sequence until it is successfully completed. After successful handshaking, data will be transmitted in network format between the smart card drive and the socketted computer via the network interface circuit of the smart card drive. At the completion of the transmission both units will return to their respective idle states.

For example, a smart card is placed in operable association with the smart card adapter 16 of smart card drive 10. A smart card, as used in connection with the present invention, resembles, and has physical dimensions similar to, a plastic bank credit card. A smart card has an integrated circuit chip embedded into the smart card that enables the card to contain read only memory (ROM) or read/write memory (RAM). The embedded memory gives the smart card the ability to store, in the smart card's memory, various types of information about the card owner or the smart card itself. The memory in the smart card can be partitioned such that a portion of the memory contains tokens (i.e. money) while another portion contains a template of the cardholder's fingerprint or picture. If the smart card has write memory, a record of each smart card transactions can be written onto the smart card's memory or the smart card's memory can be instantaneously updated to alter, for example, health care information of a smart card holder.

While it is recognized that the smart card drive 10 can be used in connection with many different applications in many different industries, for simplicity purposes, the preferred embodiment of the present invention will describe the use of the smart card in connection with a very simple secured door transaction. Therefore, the information that is stored on the smart card that will be relevant to this device application will be the user's identification, and in some circumstances, a photograph or fingerprint template that is stored on the smart card.

In general, a simple secured door transaction would be executed as follows. A user will initiate a request to open a secured door using a smart card by placing his or her smart card in operable association with the smart card adapter 16 of the smart card device 12. The request to enter is then sent to the network security server, which then drives the remainder of the transaction. The security server may request several bits of information from the user (password, fingerprint) as well as from the smart card. Once authorized, the door is opened and the transaction will be completed. This transaction illustrates all the practical component pieces of the smart card drive transaction model. Below is a detailed description of how the SCP, STP and NTP communicate with one other to accomplish this relatively simplistic example.

As illustrated by FIG. 2, the smart card device 12 of the present invention is comprised of a smart card adapter 16 (i.e. user interface) which has means for operably accepting connection of the smart card and a microprocessor 14 programmed (SCP) to communicate with the smart card adapter 16 and initiate transactions. The smart card device 12 will typically have data contacts to engage pads on the smart cards themselves. As previously discussed, the smart card device 12 is serial device that interfaces with the smart card itself and can read information from or write information to the embedded memory in the smart card via the smart card's microprocessor contained within the smart card, itself. The smart card device 12, in the present invention, employs a switch to detect whether the card is brought into operable association with the card reader 12. The switch can be a normally closed switch that is open when the card is brought into operable association with the card reader 12 or, as in this case, the switch can be an open switch that is closed when the smart card is brought into operable association with the smart card adapter 16. This switch may be triggered mechanically, magnetically or electrically, as is known in the art.

When a change in the state of the switch is detected by the microprocessor the SCP causes the microprocessor to transmit data through the serial I/O port of the smart card device 12 and to the serial I/O port of the modular computer circuit 18. The software in the modular computer (NTP) is programmed to listen for certain data transmissions entering its serial port from smart card microprocessor 14. When such data transmission is received, the firmware in the modular computer circuit 18 directs microprocessor 42 to send a "request for connection" message via I/O unit 50 and, in turn, network interface circuit 20 out through the local area network connection to a peer personal computer running an active listener program. The personal computer running the STP firmware directs the computer to respond to the "request for connection" message sent by the smart card device by acknowledging the connection request to the modular computer running the NTP. The computer is then connected to the smart card drive 10 and can request data to be read from the associated smart card or write data to the card. The data read from and written to the STP & SCP is transparent to the NTP. Once the "request for connection" is completed successfully, the NTP passes all the data to each side transparently. The NTP merely facilitates the network connection and passes data from a serial to network unchanged. The computer or STP can also ask the SCP or smart card microprocessor 14 in the smart card drive 10 to actuate the embedded on/off switches, display a message on an attached LED/LCD display, or accept user input gathered from an attached 10-key or other user input device. It is at this time that the STP would request the SCP to open a secure door if the user's ID is found in the database housed in the STP as an individual is allowed to have access to that particular door. When the computer has completed its smart card drive related tasks, the computer then requests to close the network connection to the drive 10.

As briefly discussed previously, the interchange between the peer personal computer and the smart card drive 10 is via a network data communication protocol, such as TCP/IP (Transmission Control Protocol/ Internet Protocol). The TCP protocol component defines a connection-less peer-to-peer data exchange protocol where one side initiates a "request for connection" (SYN), the second side responds with a connection request acknowledgment (SYN-ACK), and finally the first side acknowledges it's acknowledgment (ACK). This is commonly referred to as the three way handshake and is the basis for TCP program-to-program communication. Once the connection is established, the two peers can now converse with each other alternately sending and receiving data. This protocol is also colloquially referred to as a "sockets" connection. A socket represents a specific network address and communications port pair that becomes the basis for TCP communication. Each side of the communication is said to have a "sockets" connection.

IBM's System Network Architecture (SNA) also supports a peer-to-peer data communications protocol referred to by the acronym APPC (Advanced Program To Program Communication) and is the basis for their LU 6.2 (Logical unit type 6.2 in their parlance). The dynamic is similar to the TCP style connection. One side initiates a conversation request using an ALLOCATE or MC_ALLOCATE transaction. The peer responds with an ACCEPT or MC_ACCEPT. If accepted, no further acknowledgments are required and the two peers converse alternately sending and receiving data.

Apart from the network connection protocol, the smart card drive 10 of the present invention also has a proprietary transaction protocol which provides peer access to the specific aspects of the smart card drive's functionality. The following is an example transaction which illustrates the entire transaction dynamic between the smart card drive of the present invention and a network computer using this proprietary transaction protocol. In this example, assume the smart card drive 10 is connected to a local area network, although it is recognized that the smart card drive 10 can be connected directly to another network as well as a non-network personal computer. We also assume a peer personal computer is also present on the local area network and is running a peer-to-peer network program which is listening for connection events. The transaction involves a user insertion of a smart card in the smart card drive 10, subsequent connection to the peer personal computer, a request to read data from the smart card by the peer computer, the corresponding data response from the smart card drive 10, a request to write data to the smart card by the peer computer, and finally the subsequent completion and disconnect between the two peers.

First, a user places a smart card in operable association with the smart card drive 10. The smart card drive 10 activates and initiates a "request for connection" transaction message from the smart card microprocessor. This data message is 8 bytes long and consists of a single synchronization byte followed by the 7 characters "CARD IN". This 8 byte message is passed from the smart card microprocessor circuit board 14 serially to a second modular network microprocessor circuit board. The network microprocessor circuit board is a "modular computer" consisting of a computer CPU processor chip and network interface circuitry for standard local area network transports such as Ethernet, Token-Ring, or other such common protocols, as well as computer memory. Running on CPU itself is a standard public domain computer operating system, such as MIT's public domain programmable MACH operating system. This chip level operating system is additionally programmed specifically to initiate a peer-to-peer connection to the remote computer over the attached network interface circuitry. When the serial data appears from the smart card microprocessor circuit board, the network modular computer circuit board is instructed to initiate a connection request, such as a TCP "SYN/ SYN-ACK / ACK" or SNA "ALLOCATE or MC_ALLOCATE and ACCEPT". If the connection fails to take place the transaction is considered complete. If this connection process is completed, the smart card drive is then entirely controlled by the connected peer personal computer.

To read data from the smart card drive 10, the peer personal computer sends a 6 byte data message to the smart card drive 10 consisting of a one byte "synchronization byte, followed by a one byte transaction identifier representing "read card data", in this case a hexadecimal 0x02. Following the transaction identifier is a two-byte binary short integer value representing a zero based starting point in the smart card's memory where it intends a processor to start reading. The final two bytes represent a second two-byte binary short integer value representing the length of data a processor would like to read at the previously indicated starting point. At this point the program listens for the smart card drive 10 to either respond with the requested data or executes an error message if some problem occurs.

The 6 byte "read card data" message is received from the network by the network interface circuitry and is then passed straight through serially, as a transparent connection, to the smart card circuit board. The message is interpreted by the smart card circuit board and the requested data is read from the card. The smart card circuitry constructs the response message consisting of the single byte synchronization byte followed by the exact number of bytes requested in the "read card data" message and is sent serially back to the network interface circuitry. The network interface circuitry then sends the constructed response message back to the waiting peer personal computer over the local area network. The peer personal computer reads the response message data, discarding the synchronization byte.

To write data to the smart card, the peer personal computer constructs a "write card data" message consisting of a 6 byte transaction message followed by the actual card data characters to be written to the smart card. The 6 byte transaction message consists of the same single synchronization byte, followed by a one byte transaction identifier representing "write card data", in this case a hexadecimal 0x01. Following the transaction identifier is a two-byte binary short integer value representing a zero based starting point in the smart card's memory where the STP intends the data to be written. The final two bytes represent a second two-byte binary short integer value representing the length of data to be written starting at the previously indicated starting point. The entire message, both transaction and data components, is sent to the smart card drive over the local area network and is received by the network interface circuitry. Like the read request, the write request is passed serially to the smart card circuitry. The data is written to the smart card. There is no response message for a smart card write transaction.

From here the peer personal computer can initiate other commands supported by the smart card drive by using a common command format consisting of 6 bytes, each eight bits long and which, as discussed above, would read as follows:

12H/Command/Address Hi/Address Lo/Bytes Hi/Bytes Lo.

Although it is not necessary, it is preferred that each command line begin with a synchronization byte, similar to the 12H header, that will notify both the server application and firmware on the smart card device of the beginning of each new string of data sent across the network. In the preferred embodiment, the synchronization byte is configurable to avoid reserving a synchronization byte that may mean something different to another device interface card application, or another manufacture's device interface card for the same application. The command protocol may also include an error detection/correction byte (CRC, parity, etc.).

The following are examples of the different command lines that can be used by the both the smart card drive and the communication network computer. Together, with the command lines discussed above, these would represent a very basic command set under which the network application and the firmware of the smart card microprocessor could use to communicate.

(1) To activate the smart card drive LED the network computer could send a 6 byte command line consisting of a synchronization byte, followed by a two byte hexadecimal transaction number pair, followed by two null bytes, and finally a one byte hexadecimal color code. It is not necessary for the smart card drive to generate a response to this transaction.

(2) To activate LED Light the network computer could send the following 6 byte command line. Again, it is not necessary that the smart card drive generate a response to this transaction.

| | |
|---|---|
| SyncByte | 0x12 (NOTE The sync byte is configurable) |
| Utility Transaction | 0x10 |
| LED Utility | 0x02 |
| 1$^{st}$ Null Byte | 0x00 |
| 2$^{nd}$ Null Byte | 0x00 |
| Light Color | 0x00 = OFF |
| | 0x01 = RED |
| | 0x02 = GREEN |
| | 0x03 = YELLOW |

(3) To read on/off switch values the network computer would generate a 6 byte command line consisting of a synchronization byte, followed by a two byte hexadecimal transaction number pair, followed by three null bytes.

| | | |
|---|---|---|
| Query switches | SyncByte | 0x12 (NOTE The sync byte is configurable) |
| | Utility Transaction | 0x10 |
| | Query Switch | 0x08 |
| | 1$^{st}$ Null Byte | 0x00 |
| | 2$^{nd}$ Null Byte | 0x00 |
| | 3$^{rd}$ Null Byte | 0x00 |

The smart drive then generates a three byte response data message which transaction consists of:

| | |
|---|---|
| SyncByte | 0x12 (Again, configurable) |
| Number value | 2 byte character number |

These are only a few transactions. Others transactions may include getting user 10-key keypad entry characters or display a message on a locally attached LCD display. When all transactions are complete the peer personal computer closes the peer-to-peer connection and both parties return to idle state.

The foregoing description and drawings merely explain and illustrate the invention and the invention is not limited thereto. Those of the skill in the art who have the disclosure before them will be able to make modifications and variations therein without departing from the scope of the present invention.

We claim:

1. A self actuating peripheral device for communicating across a network with a server and the self actuating peripheral device comprising:

a first transaction serial device initiating a transaction based on a change of state;

a serial client transaction processor coupled with said first transaction serial device and said serial client transaction processor responsive to the initiation of the transaction to send a transaction initiation request and said serial client transaction processor further responsive to a serial read message request to send the serial data message; and a network transport processor coupled with said serial client transaction processor and said network transport processor responsive to the transaction initiation request to establish a connection across the network with the server and the network transport processor further responsive to a read request from the server to send a serial translation of the read request to said serial client transaction processor and to convert the serial data message from said serial client transaction processor to a network message to the server.

2. The self-actuating peripheral device as recited in claim 1, wherein said first transaction serial device includes responsiveness to insertion of a smart card to initiate the transaction.

3. The self-actuating peripheral device as recited in claim 2, further comprising:

a second transaction serial device coupled with said serial client transaction processor and initiating a transaction including a verification of a biometric parameter of a user based the read request from the server.

* * * * *